(12) United States Patent
Sloan et al.

(10) Patent No.: US 11,641,367 B2
(45) Date of Patent: May 2, 2023

(54) METHOD AND APPARATUS FOR CONTROLLER AREA NETWORK BUS INTRUSION DETECTION AND NEUTRALIZATION

(71) Applicant: Voyomotive, LLC, San Francisco, CA (US)

(72) Inventors: Adam Sloan, Saline, MI (US); Robert Vogt, IV, Saline, MI (US)

(73) Assignee: Voyomotive, LLC, Sarasota, FL (US)

( * ) Notice: Subject to any disclaimer, the term of this patent is extended or adjusted under 35 U.S.C. 154(b) by 311 days.

(21) Appl. No.: 17/257,047

(22) PCT Filed: Aug. 6, 2020

(86) PCT No.: PCT/US2020/045091
§ 371 (c)(1),
(2) Date: Dec. 30, 2020

(87) PCT Pub. No.: WO2021/030123
PCT Pub. Date: Feb. 18, 2021

(65) Prior Publication Data
US 2022/0303287 A1    Sep. 22, 2022

Related U.S. Application Data

(60) Provisional application No. 62/885,452, filed on Aug. 12, 2019.

(51) Int. Cl.
*H04L 9/40* (2022.01)
(52) U.S. Cl.
CPC ...... *H04L 63/1416* (2013.01); *H04L 63/1441* (2013.01)

(58) Field of Classification Search
CPC . H04L 63/1416; H04L 63/1441; H04L 43/16; H04L 63/1425; G06F 2201/88; G06F 21/554
See application file for complete search history.

(56) References Cited

U.S. PATENT DOCUMENTS

| | | |
|---|---|---|
| 8,955,130 B1 | 2/2015 | Kalintsev et al. |
| 9,380,070 B1 | 6/2016 | Cain et al. |

(Continued)

OTHER PUBLICATIONS

Patel, "Intrusion Detection using Bit Timing Characteristics for CAN Bus." In: Diss. Virginia Tech Jun. 17, 2019.

(Continued)

*Primary Examiner* — Ali S Abyaneh
(74) *Attorney, Agent, or Firm* — James D. Petruzzi; The Petruzzi Law Firm (57) ABSTRACT

A method and system for detecting intrusion on a CAN bus or vehicle network and neutralizing unauthorized intrusions. The system monitors the bit timing characteristics of CAN bus messages, message establishes trusted bit timing characteristics, and identifies unauthorized CAN bus messages. The device neutralizes unauthorized messages on the CAN bus by injecting data on the CAN bus at the appropriate time, preventing the unauthorized messages from being received, and presents alerts upon detection of the one or more of intrusions. It can be used as a standalone or hard-wired system, and may be accessible to the ODB-II port, relay or fuse port on a vehicle and may put other electronic control units on the vehicle into a safe operating mode upon receipt of the intrusion, neutralize all CAN message identifiers or set the intrusion detection flag to TRUE for all CAN message identifiers, sent by the same electronic control unit node.

19 Claims, 4 Drawing Sheets

(56) References Cited

U.S. PATENT DOCUMENTS

| | | |
|---|---|---|
| 9,401,923 B2 | 7/2016 | Valasek et al. |
| 2008/0186870 A1 | 8/2008 | Butts et al. |
| 2008/0282348 A1 | 11/2008 | Proudler et al. |
| 2009/0076911 A1* | 3/2009 | Vo ................... G06Q 20/223 |
| | | 342/118 |
| 2014/0250530 A1 | 9/2014 | Moeller et al. |
| 2015/0089236 A1 | 3/2015 | Han et al. |
| 2015/0191135 A1 | 7/2015 | Ben Noon et al. |
| 2016/0197944 A1* | 7/2016 | Allouche ............ H04L 63/1416 |
| | | 726/23 |
| 2016/0308891 A1* | 10/2016 | Cain ..................... H04L 67/12 |
| 2017/0093908 A1 | 3/2017 | Elend |
| 2018/0025156 A1* | 1/2018 | Dagan ................ H04L 63/1483 |
| | | 713/161 |
| 2018/0189483 A1* | 7/2018 | Litichever ............... H04L 67/12 |
| 2020/0213351 A1* | 7/2020 | Shin ....................... H04L 12/40 |
| 2021/0044600 A1* | 2/2021 | Elend ................... H04L 1/0061 |

OTHER PUBLICATIONS

Rizvi et al., "Protecting an automobile network using distributed firewall system." In: Proceedings of the Second International Conference on Internet of things, Data and Cloud Computing. Mar. 22, 2017.

* cited by examiner

METHOD AND APPARATUS FOR CONTROLLER AREA NETWORK BUS INTRUSION DETECTION AND NEUTRALIZATION

CROSS REFERENCE TO RELATED APPLICATIONS

This application claims the benefit of U.S. Provisional Patent Application Ser. No. 62/885,452 filed on 12 Aug. 2019 entitled "A Method and apparatus for Controller Area Network bus intrusion detection and neutralization" which is incorporated herein by reference.

BACKGROUND OF THE INVENTION

The Controller Area Network (CAN) bus is a data bus that is commonly used in automotive, off highway vehicles, aerospace, industrial automation, and commercial building applications. The CAN bus is the standard in the automotive industry and is used on most modern vehicles. Modern vehicles have many Electronic Control Units (ECU) nodes that control all vehicle systems such as the engine, transmission, steering, brakes, body, etc. These ECU nodes communicate on the vehicle's CAN bus in the form of messages. Messages sent over the vehicle's CAN bus are used in all aspects of the vehicle's operation including acceleration, braking, steering, vehicle access, and safety systems.

The CAN bus allows ECU nodes to communicate with each other in the form of messages without a host computer. However, the CAN bus does not have a native method to verify that the messages that are being sent and received on the CAN bus are from a trusted source. This creates a security vulnerability for applications that are using the CAN bus.

The security of the CAN bus in automotive and other applications is an area of increasing importance and focus. Numerous vehicle security breaches have been reported in recent years. Modern vehicles make little or no attempt to verify that the messages that are being sent and received on the vehicle's CAN bus are from a trusted source.

The security of a modern vehicle can be breached by sending unauthorized messages on the vehicle's CAN bus. Unauthorized messages can be sent by unauthorized ECU nodes that have been added to the vehicle's CAN bus or by existing ECU nodes that have been compromised. Unauthorized messages on the vehicle's CAN bus can affect all aspects of the vehicle's operation, potentially with great consequences.

To maintain the security of the CAN bus, there is a need to detect CAN bus intrusion in the form of unauthorized messages and unauthorized ECU nodes. Additionally, there is a need to neutralize any unauthorized CAN bus intrusion in the form of unauthorized messages to prevent these unauthorized messages from causing unwanted behavior in the application.

BRIEF SUMMARY OF THE INVENTION

The primary advantage of the invention is to provide a system for detection of unauthorized communications over the CAN bus in a vehicle.

Another advantage of the invention is to provide a system for neutralization of improper or unauthorized messages on the CAN bus.

Yet another advantage of the invention is to provide a software system for detecting and tracking data communications using bit timing characteristics over the CAN bus for analysis.

The invention is a device for detecting intrusion on a CAN bus and neutralizing unauthorized intrusions. The device monitors the bit timing characteristics of CAN bus messages, establishes trusted bit timing characteristics, and identifies unauthorized CAN bus messages. The device neutralizes unauthorized messages on the CAN bus by injecting data on the CAN bus at the appropriate time, preventing the unauthorized messages from being received.

In accordance with a preferred embodiment of the invention, there is shown a method for vehicle network bus or Controller Area Network bus intrusion detection and neutralization for a vehicle comprising a vehicle network bus and electronic control units coupled to the vehicle network bus providing the vehicle with a predetermined electronic control unit, the predetermined electronic control unit comprising: a processor; a memory; and an interface to the vehicle network bus based on a CAN (Controller Area Network) or other network standard, operating the electronic control unit to monitor messages on the CAN or network bus, monitoring the unique bit timing characteristics of each incoming message to establish trusted bit timing characteristics for the message and changing a trusted flag from a default of FALSE to TRUE, comparing the bit timing characteristics of the most recent message to the trusted bit timing characteristics for the message identifier against a predetermined threshold limit and increasing a detection counter by 1 if not within the threshold, and reducing the detection counter by 1 if within a threshold limit; setting the intrusion detection flag to TRUE if the detection counter reaches a threshold limit, and operating the predetermined electronic control unit to generate an alert upon detection of the one or more of intrusions.

In accordance with a preferred embodiment of the invention, there is shown a system for intrusion detection and neutralization for a vehicle on a vehicle network bus having a predetermined electronic control unit, the predetermined electronic control unit comprising: a processor; a memory; and an interface to the vehicle network bus based on a network standard, the electronic control unit monitors messages on the bus for the unique bit timing characteristics of each incoming message to establish trusted bit timing characteristics for the message and changing a trusted flag in the memory from a default of FALSE to TRUE, a detection counter that increases by 1 if the most recent message does not meet a pre-determined threshold and reduces by 1 if the message identifier is within a pre-determined threshold, the detection counter sets the detection flag to TRUE if the detection counter reaches a threshold limit, and the electronic control unit generates an alert upon detection of one or more intrusions based on the status of the intrusion detection flag.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure or manner.

The intrusion detection and neutralization device has a computer processor and on board memory. The device has the ability to measure precise time quantities such as the relative timing of individual bits using hardware such as an input compare block. The device has a CAN controller and CAN transceiver to allow it to receive and transmit messages. When the device is connected to an existing CAN bus it has the ability to receive all CAN bus messages on that CAN bus and has the ability to transmit CAN bus messages on that CAN bus. The device can optionally detect intrusion and neutralize unauthorized intrusions on multiple CAN buses. The device can be a standalone ECU or can be part of an existing ECU or a combination of ECU's. The device can be installed on the CAN bus at the time of manufacture or it can be an aftermarket component that is installed after the time of manufacture. It is to be understood that the system and method can be employed on any of a variety of network and bus configurations.

If the device is installed on a vehicle CAN bus, the device can be an OEM (original equipment manufacturer) ECU (electronic control unit) included with the vehicle at the time of manufacture, or it can be an aftermarket ECU that is installed on the vehicle after the vehicle has been manufactured. The device can be executed on the hardware of an existing ECU on the vehicle. The existing ECU can be reprogrammed to execute the invention. The device can be an aftermarket product that is connected to an appropriate, standard vehicle connection outlet such as an OBD-II port, a relay socket, or a fuse port. The device can be custom installed by connecting to existing wires and harnesses within the vehicle, including splicing into these components when required.

Figures 1A, 1B:
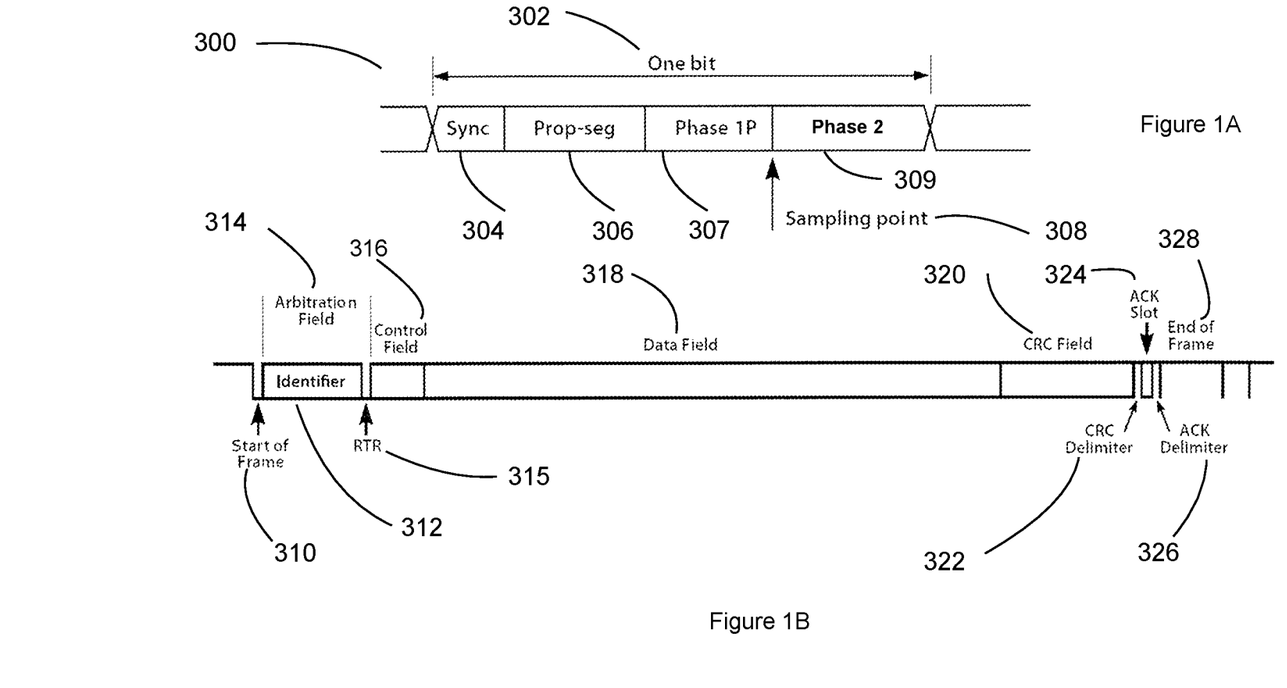
FIGS. 1A and 1B show a schematic of a sampling point for one bit in a data sequence and a group of bit fields for data communications.

The CAN bus allows ECU nodes to communicate with each other in the form of messages. FIG. 1A shows a typical CAN bit time segment sequence with SYNCHRONIZATION SEGMENT "Sync" 304, a Propagation Segment, "Prop-seg" 306, Phase segment 1, "Phase 1P" 307, and Phase Segment 2, "Phase 2" 309 all forming one bit 302. Sync. 304 is the first segment and is used to synchronize the nodes on the bus. Prop-seg 306 exists to compensate for physical delays between nodes. The two phase segments Phase 1P 307 and Phase 2 309 are used to compensate for edge phase errors on the bus.

As shown in FIG. 1B, Each CAN message has different parts including the start of frame 310, identifier 312, Remote Transmission Request "RTR" 315, control field 316, data field 318, Cyclic Redundancy Check "CRC" delimiter 322, acknowledge "ACK" slot 324, ACK delimiter 326, and end of frame 328. Arbitration Field 314 determines priority based on identifier 312 that has as part of the message an indication of priority when two incoming messages arrive.

Each part of the CAN message contains a varying number of bits. Each ECU on the CAN bus typically transmits at least one message, and typically transmits more than one message. Each ECU on the CAN bus typically transmits message(s) that have unique identifiers that are only transmitted by that ECU.

The bit timing characteristics transmitted by one ECU node will vary from the bit timing characteristics transmitted by another ECU node due to physical variation and configuration differences between the ECU nodes. The bit timing characteristics within the message(s) transmitted by one ECU node will vary from the bit timing characteristics within the messages transmitted by another ECU node. The unique bit timing characteristics that will vary between ECU nodes include:

The length of 1 time quantum 108.
The length of 1 bit 100.
The length of the Synchronization Jump Width (SJW) 110.

These unique bit-timing characteristics are monitored by the intrusion detection and neutralization device.

In order to create a CAN bus message, each ECU node on the CAN bus contains a CAN controller and CAN transceiver. The CAN controller allows for the configuration of bit timing for that ECU node using Bit Timing Registers (BTRs). Typical BTRs allow for the configuration of:

Clock prescaler.
Time quanta before sampling point.
Time quanta after sampling point.
Length of the SJW.
Number of samples to take in each bit.

The clock prescaler BTR is used to configure a finite quantum of time that is used in the bit timing for each ECU node, the length of 1 time quantum. The CAN controller requires an oscillator signal input that is used as a clock reference. The oscillator signal is at a higher frequency than the bit rate, for example 16 MHz. 1 time quantum is one period of the oscillator signal multiplied by the clock prescaler BTR. The length of 1 time quantum for a specific ECU node will vary based on configuration differences in the clock prescaler BTR for that ECU node.

There is physical variation in the oscillator signal input into the CAN controller for each ECU node. The oscillator signal input will vary in the specified reference frequency, for example 20 MHz. The oscillator signal input will vary in the specified frequency tolerance for the oscillator, for example 100 parts per million. The oscillator signal input will vary based on the voltage input into the oscillator and the temperature of the oscillator. The length of 1 time quantum for a specific ECU node will vary based on the physical variation of the oscillator signal that is input into that ECU node.

The time quanta before sampling point BTR and time quanta after sampling point BTR are used to configure the length of 1 bit for each ECU node. There are a finite number of time quanta before the sampling point and a finite number of time quanta after the sampling point. The number of time quanta before the sampling point added to the number of time quanta after the sampling point configures the length of 1 bit for a specific ECU node. See FIGS. 1A and 1B showing one bit 302 and time quanta before and after sampling at sampling point 308. The length of 1 bit for a specific ECU node will vary based on the length of 1 time quantum for that ECU node as well as configuration differences in the time quanta before sampling point and time quanta after sampling point BTRs for that ECU node.

There is no central clock on the CAN bus that each ECU node can synchronize to. To stay synchronized to each other, each ECU node synchronizes as appropriate with the other ECU nodes that are transmitting and receiving on the CAN bus. The CAN controller for each ECU node will shorten or lengthen the length of an individual bit by an integral number of time quanta when necessary in order to stay synchronized to the other ECU nodes on the CAN bus. The maximum number of time quanta that can be shortened or lengthened to stay synchronized is the length of the SJW. This length of the SJW is configured using the length of the SJW BTR. The length of the SJW for a specific ECU node will vary based on the configuration differences in the length of the SJW BTR for that ECU node.

The device monitors the length of 1 bit in an individual CAN message by measuring individual bits during specific parts of the message. The device measures the length of 1 bit during the control field 316, data field 318, and CRC field 320 parts of the CAN message. During these parts of the CAN message only the ECU node that has won arbitration is transmitting on the CAN bus. The device can take one measurement of the length of 1 bit per individual CAN message. The device can take multiple measurements of per individual CAN message and average them to determine the length of one bit for that CAN message.

The device monitors the length of 1 time quantum in an individual CAN message by monitoring the individual CAN message for a synchronization and measuring individual bits when a synchronization occurs. During the arbitration field of the CAN message, the ECU node that will win arbitration and transmit the CAN message may not be the initial transmitter. In this case, the ECU node that will transmit the CAN message may need to synchronize to the initial transmitter by shortening or lengthening the length of an individual bit by an integral number of time quanta. When this synchronization occurs, the device measures the individual bit where this occurs and determines the amount of shortening or lengthening by comparing that bit to the bits in the later parts of the message.

During the acknowledge field of the CAN message, the ECU node that transmits the acknowledgement differs from the ECU node that transmitted the CAN message. The ECU node that transmitted the CAN message may need to synchronize to the ECU node that transmitted the acknowledgement by shortening or lengthening the length of an individual bit by an integral number of time quanta. When this synchronization occurs, the device measures the individual bit and determines the amount of shortening or lengthening by comparing that bit to the bits in the earlier parts of the message.

Each time a synchronization occurs, the amount of shortening or lengthening is determined by the device. The smallest amount of shortening or lengthening is determined to be the length of 1 time quantum for that CAN message. When a synchronization occurs, if the amount of shortening or lengthening is smaller than the previous length of 1 time quantum, this is then determined to be the length of 1 time quantum for that CAN message. The largest amount of shortening or lengthening is determined to be the length of the Synchronization Jump Width (SJW) for that CAN message. When a synchronization occurs, if the amount of shortening or lengthening is larger than the previous length of 1 time quantum, this is then determined to be the length of the Synchronization Jump Width (SJW) for that CAN message.

The frequency of synchronizations on the CAN bus will vary based on the number of ECU nodes and physical characteristics of the CAN bus. Optionally, the device can transmit bits onto the CAN bus to force a synchronization to occur more frequently than it would otherwise occur. The device can transmit bits during the arbitration fields and acknowledge fields that are at the edge of the timing tolerance. This will allow the ECU node transmitting the individual CAN message to continue to transmit the individual CAN message without interruption, but will require the ECU node transmitting the individual CAN message to synchronize to this adjusted timing. This allows the device to more quickly determine the length of 1 time quantum and the length of the Synchronization Jump Width (SJW) of an individual CAN message.

Figure 2:
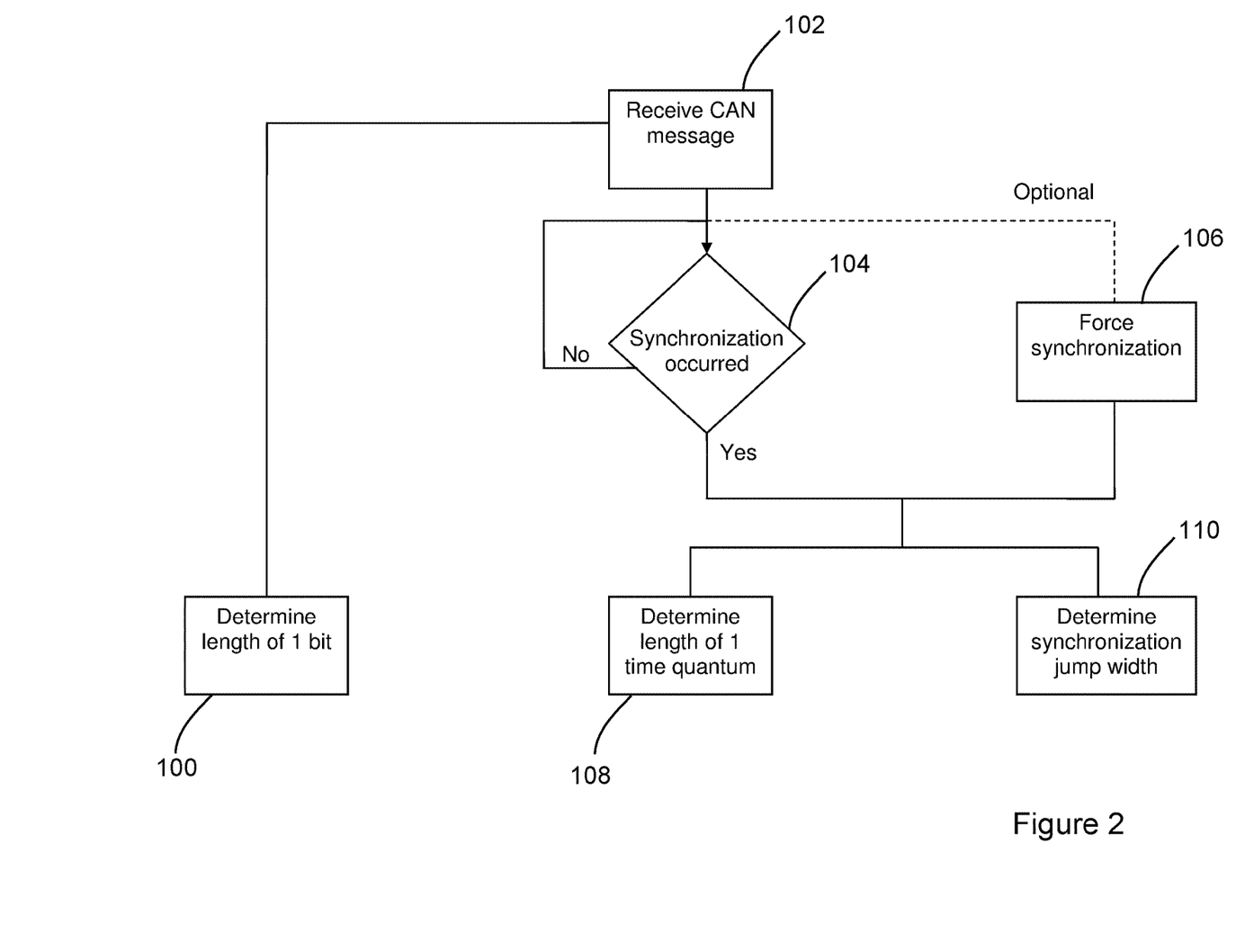
FIG. 2 shows a flow chart of the method according to a preferred embodiment of the invention.

FIG. 2 is a flow chart depicting this initial process of determining the length of 1 bit. At step 100 there is shown determination of length of 1 bit by receiving the CAN message at step 102. If synchronization has occurred at step 104, it proceeds to YES and determines at step 108 the length of 1 time quantum and at step 110 simultaneously determines the synchronization jump width. If no synchronization occurs at step 104, it proceeds to NO and optionally may force synchronization at step 106 and proceed to steps 108 determine length of 1 time quantum and 110 determine synchronization jump width.

The device repeatedly monitors the unique bit timing characteristics of each incoming CAN bus message to establish trusted bit timing characteristics for each message. The device then uses the message identifier trusted flag and the trusted bit timing characteristics a given CAN bus message is trusted.

When the device receives an individual CAN bus message with a message identifier that it has received before, it determines the bit timing characteristics for that message. The total number of times that this message identifier has been received is incremented by 1. The device then compares the bit timing characteristics of this most recent message to the average of the bit timing characteristics of the previous historic messages that have been received with this message identifier. If the bit timing characteristics of the most recent message are within a threshold limit of the average of the previous historic messages that have been received with this message identifier, the bit timing characteristics are determined to be a match. If the bit timing characteristics are determined to be a match, the number of times that this message identifier has been received with this bit timing characteristics is incremented by 1.

Figure 3:
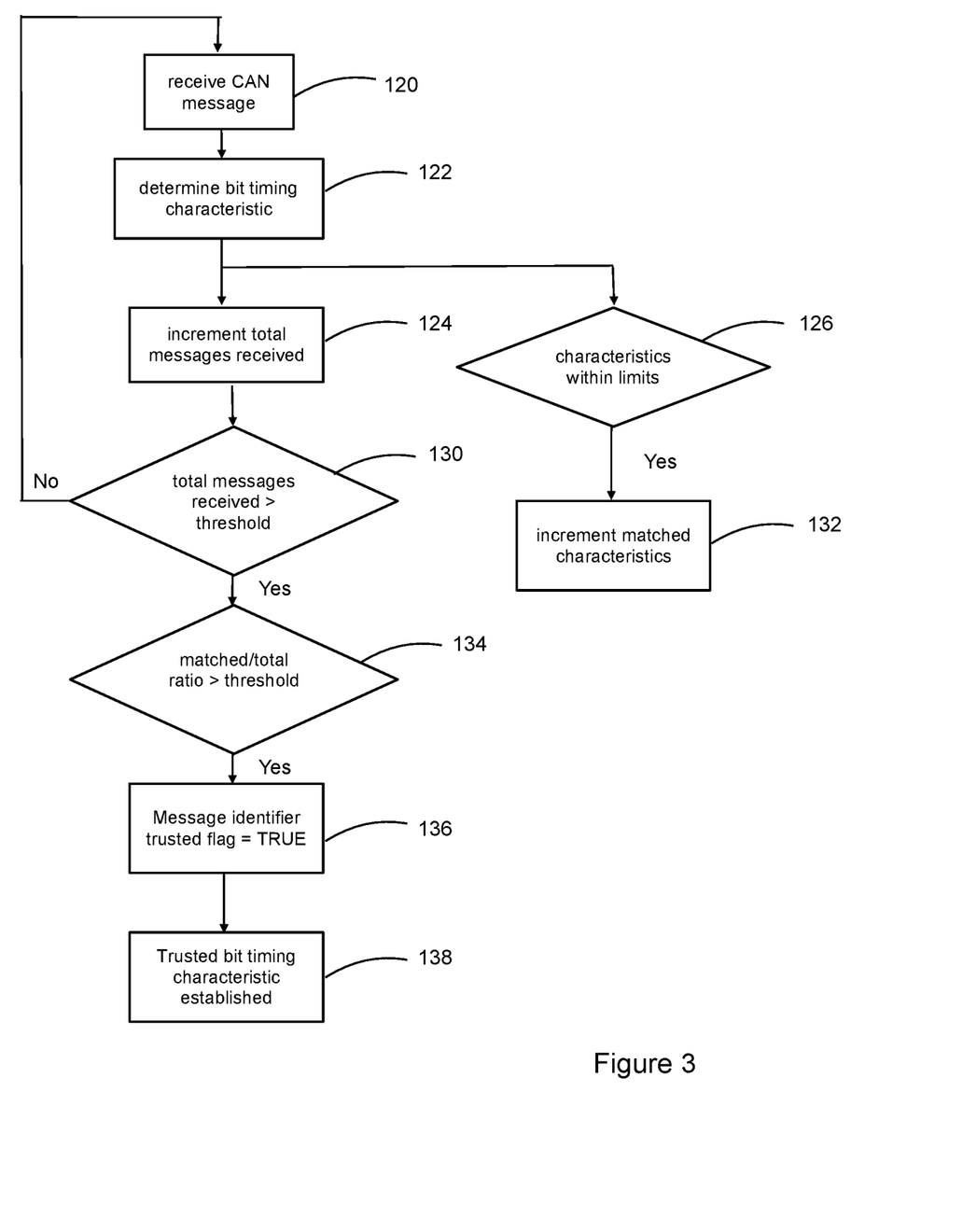
FIG. 3 shows a flow chart of the method according to a preferred embodiment of the invention.

FIG. 3 shows a flow diagram of this process. As each incoming CAN bus message is received at step 120, the device stores in its memory Message identifier; Message bit timing characteristics is determined at step 122 and if the characteristics are within limits at step 126 is yes, it stores that increment matched characteristics at step 132; total number of times that this message identifier has been received at step 124; and number of times that this message identifier has been received with these bit timing characteristics at step 126. If total messages received exceeds a pre-determined threshold YES at step 130 and the matched to total ratio exceeds a pre-determined threshold at step 134, the message identifier trusted flag is set to TRUE at step 136 and the trusted bit timing characteristic is established at step

138. If the total message received has not reached the pre-determined threshold at step 130 NO and more messages are received.

When the total number of times that this message identifier has been received reaches a pre-determined number, for example 1000, this is compared to the number of times that this message identifier has been received with these bit timing characteristics. If at this point the total number of times that this message identifier has been received is within a threshold ratio in relation to the number of times that this message identifier has been received with this bit timing characteristics, for example 950/1000, the message identifier trusted flag is set to TRUE. Otherwise the message identifier trusted flag is set to FALSE. The message identifier trusted flag is initially set to FALSE. The incoming CAN bus messages are received at different rates, so it will take longer for the message identifier trusted flag for some messages to be set to TRUE. When the message identifier trusted flag is set to TRUE, the trusted bit timing characteristics are also established. The trusted bit timing characteristics for the message identifier are set to the average of the bit timing characteristics of the previous historic messages that have been received with this message identifier.

After the message identifier trusted flag is set to TRUE for a given message identifier, the device monitors for deviations from the trusted bit timing characteristics. When the device receives an individual CAN bus message with a message identifier that it has received before, the device continues to determine the bit timing characteristics for that message. The device then compares the bit timing characteristics of this most recent message to the trusted bit timing characteristics for this message identifier. If the bit timing characteristics of the most recent message are not within a threshold limit of the trusted bit timing characteristics, the intrusion detected counter is increased by 1. If the bit timing characteristics of the most recent message are within a threshold limit of the trusted bit timing characteristics, the intrusion detected counter is decreased by 1. If the intrusion detected counter reaches a threshold limit, for example 5, the intrusion detection flag is set to TRUE for this message identifier. The intrusion detected flag is initially set to FALSE. When the intrusion detection counter reaches a maximum value, for example 20, the intrusion detection counter does not increment beyond the maximum value.

When the intrusion detection flag is set to TRUE, the device can optionally neutralize the CAN message. When the device neutralizes the message, it is not received by any ECU on the CAN bus, which prevents the message from adversely effecting the behavior of the ECUs on the CAN bus. The device can neutralize the CAN message by causing a Bit Stuffing Error. The device can cause a Bit Stuffing Error by asserting the dominant state on the CAN bus while the CAN message is being transmitted. Each ECU on the CAN bus has the ability to assert the dominant state on the CAN bus. Asserting a dominant state on the CAN bus prevents the recessive state from being observed by the other ECUs on the CAN bus. If the other ECUs on the CAN bus receive 6 dominant bits in a row, a Bit Stuffing Error will be registered by the other ECUs. This will cause the other ECUs to not accept this message, and the offending intrusion message will be neutralized.

The device can neutralize the CAN message by causing a Frame Check Error. The device can cause a Frame Check Error by asserting the dominant state on the CAN bus as shown in FIG. 1B during the CRC delimiter 322, ACK delimiter 326, and/or End of Frame 328 parts of the CAN bus message where the CAN bus is expected to be in a recessive state. If the other ECUs on the CAN bus receive a dominant state when the CAN bus is expected to be in a recessive state during the CRC delimiter 322, ACK delimiter 326, or End of Frame 328 parts of the CAN bus message, a Frame Check Error will be registered by the other ECUs. This will cause the other ECUs to not accept this message, and the offending intrusion message will be neutralized.

The device can neutralize the CAN message by causing a CRC Error. The device can cause a CRC Error by asserting the dominant state on the CAN bus during a portion of the CRC field part of the CAN bus message. This will cause the CRC field to be a different value than it would otherwise be. The other ECUs on the vehicle will receive this CRC field, attempt to calculate the CRC for the CAN message, and determine that there is a CRC Error. This will cause the other ECUs to not accept this message, and the offending intrusion message will be neutralized.

When the intrusion detection flag is set to TRUE for a given CAN message identifier, the intrusion detection flag can often stay above the threshold limit for some time, which will result in new CAN messages with this identifier being neutralized as soon as they are received. If the intrusion detection flag is set to TRUE for a given message identifier and the intrusion detection counter is above the threshold limit, the next time a CAN message with this message identifier is received the device will continue to compare the bit timing characteristics of this most recent message to the trusted bit timing characteristics. The intrusion detection counter will still be incremented or decremented by 1 as appropriate, but the still CAN message will be neutralized since the intrusion detection counter is above the threshold limit. If an unauthorized ECU node has been added, or an existing ECU node has been compromised, the CAN messages transmitted will continue to not be within the threshold limit of the trusted bit timing characteristics, and the CAN messages will continue to be neutralized.

When the intrusion detection flag is set to TRUE, the device can optionally provide external notification of the intrusion. The device can communicate the intrusion to the vehicle user by controlling external indicators such as a flashing LED or a siren. The device can communicate the intrusion to the other ECUs on the vehicle over the CAN bus. The device can communicate the intrusion to the vehicle ECU that is controlling the instrument panel, which can result in a message displayed to the user on the instrument panel. The device can communicate the intrusion to the vehicle ECU that is connected to the telematics system that communicates with the OEM telematics server, which would allow the intrusion detection to be sent to the to OEM telematics server. The other ECUs on the vehicle can optionally enter a safe operating mode upon receipt of the intrusion.

After the message identifier trusted flag is set to TRUE for a given message identifier, the trusted bit timing characteristics for that message identifier can be compared to the trusted bit timing characteristics of the other message identifiers. This allows the device to determine if multiple message identifiers are being sent by the same ECU node. The bit timing characteristics transmitted by one ECU node will vary from the bit timing characteristics transmitted by another ECU node, and each ECU node on the CAN bus typically transmits more than one message. If the trusted bit characteristics for a given message identifier are within a threshold range of the trusted bit timing characteristics of one or more other message identifiers, these message identifiers are determined to be sent by the same ECU node. A grouping of message identifiers sent by one ECU node can be determined using this method.

If the intrusion detection flag is set to TRUE for a given message identifier, and that message identifier is a group of message identifiers sent by one ECU node, the device can optionally set the intrusion detection flag to TRUE for the other message identifiers sent by that ECU. In this case, when the intrusion detection flag is subsequently set to FALSE for the initial message identifier, the intrusion detection flag would also be set to FALSE for all of the other message identifiers sent by that ECU. This allows the device to optionally neutralize all CAN messages being sent by a given ECU. This allows the device to optionally provide external notification of the intrusion for all CAN messages being sent by a given ECU. This is useful as the CAN bus is often compromised at the ECU node level where unauthorized ECU nodes are added to the vehicle's CAN bus or existing ECU nodes are compromised.

Figure 4:
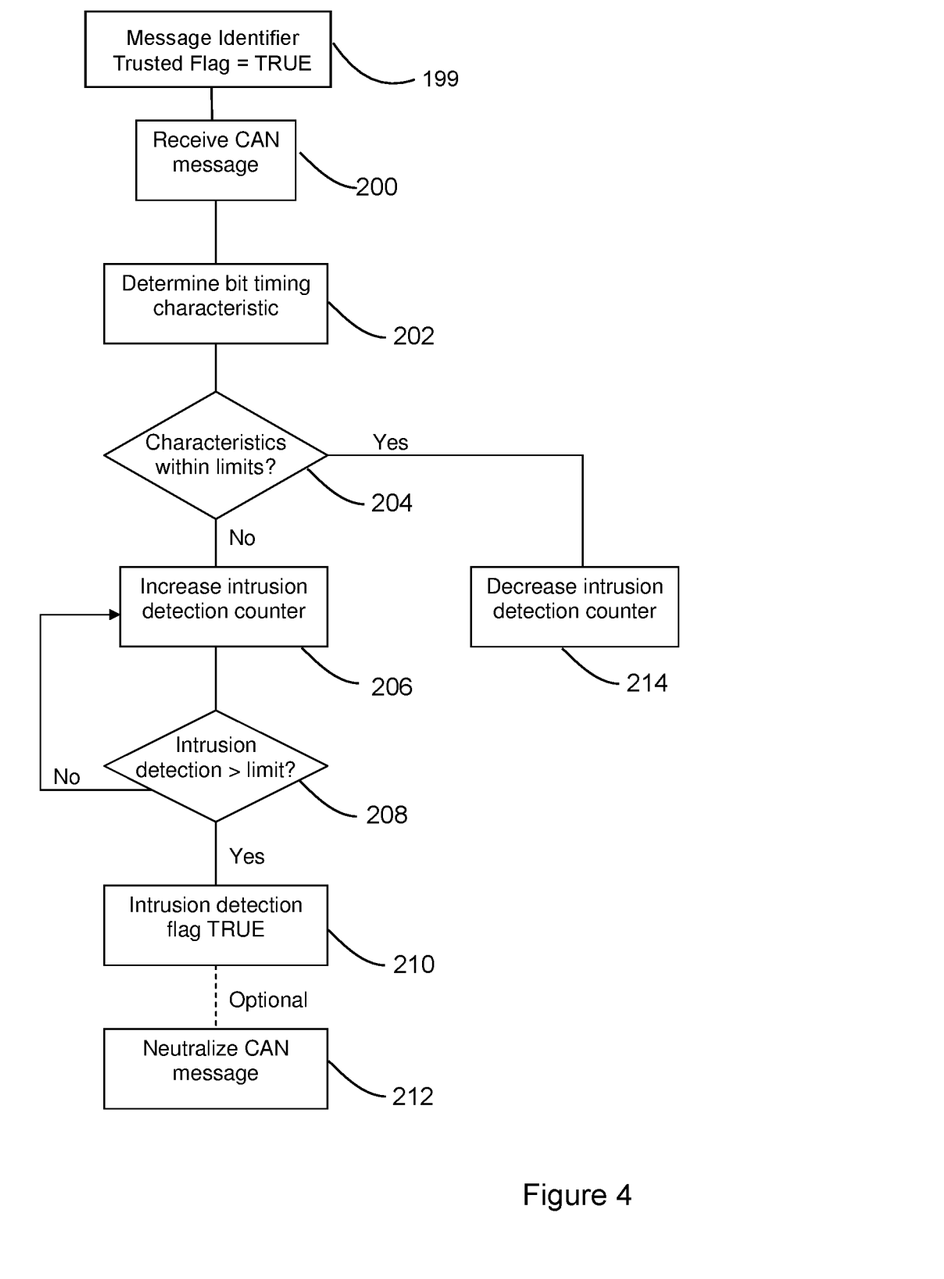
FIG. 4 shows another flow chart of the method according to a preferred embodiment of the invention.

FIG. 4 is a flowchart further depicting the process of a preferred embodiment of the invention. The process begins with the Message Identifier Trusted Flag set at TRUE at step 199, followed by reception of a CAN message at step 200, and at step 202 determination of the bit timing characteristic. Step 204 queries whether the characteristic is within limits. If YES, it proceeds to step 214 and decreases the intrusion detection counter. If NO, the intrusion detection counter is increased in step 206. Query step 208 asks whether the intrusion detection has exceeded a pre-determined limit. If No, the process goes back to step 206 and increases the intrusion detection counter. If YES, an intrusion detection flag is set to TRUE at step 210. Optionally, at step 212 the system can neutralize a CAN message.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the later issued claims.

The invention claimed is:

1. A Method for Controller Area Network bus intrusion detection and neutralization for a vehicle comprising a vehicle network bus and electronic control units coupled to said vehicle network bus, said method comprising:
   providing the vehicle with a predetermined electronic control unit, the predetermined electronic control unit comprising: a processor; a memory; and an interface to the vehicle network bus based on a CAN (Controller Area Network) standard;
   operating the electronic control unit to monitor messages on the CAN bus;
   monitoring a unique bit timing characteristics of each incoming message to establish trusted bit timing characteristics for the message and changing a trusted flag from a default of FALSE to TRUE;
   comparing the bit timing characteristics of the most recent message to the trusted bit timing characteristics for a message identifier against a predetermined threshold limit and increasing a detection counter by 1 if not within the threshold limit, and reducing the detection counter by 1 if within the threshold limit;
   setting an intrusion detection flag to TRUE if the detection counter reaches the threshold limit, and
   operating the predetermined electronic control unit to generate an alert upon detection of one or more intrusions.

2. The Method for Controller Area Network bus intrusion detection and neutralization for a vehicle comprising a vehicle network bus and electronic control units coupled to the vehicle network bus as claimed in claim 1 further comprising a CAN controller and CAN receiver.

3. The Method for Controller Area Network bus intrusion detection and neutralization for a vehicle comprising a vehicle network bus and electronic control units coupled to the vehicle network bus as claimed in claim 1 further comprising the step of neutralizing a message after an intrusion is detected.

4. The Method for Controller Area Network bus intrusion detection and neutralization for a vehicle comprising a vehicle network bus and electronic control units coupled to the vehicle network bus as claimed in claim 1 further comprising the step of communicating an intrusion detection to a second electronic control unit on the vehicle over the CAN bus.

5. The Method for Controller Area Network bus intrusion detection and neutralization for a vehicle comprising a vehicle network bus and electronic control units coupled to the vehicle network bus as claimed in claim 1 further comprising the step of communicating with the vehicle using an OBD-II port.

6. The Method for Controller Area Network bus intrusion detection and neutralization for a vehicle comprising a vehicle network bus and electronic control units coupled to the vehicle network bus as claimed in claim 1 further comprising the steps of setting other electronic control units on the vehicle into a safe operating mode upon detection of the one or more intrusions.

7. The Method for Controller Area Network bus intrusion detection and neutralization for a vehicle comprising a vehicle network bus and electronic control units coupled to the vehicle network bus as claimed in claim 1 further comprising the step of transmitting bits onto the CAN bus to force synchronization.

8. The Method for Controller Area Network bus intrusion detection and neutralization for a vehicle comprising a vehicle network bus and electronic control units coupled to the vehicle network bus as claimed in claim 1 further comprising the step of determining a length of a Synchronization Jump Width (SJW) for the message.

9. A Method for bus intrusion detection and neutralization for a vehicle comprising a vehicle network bus and electronic control units coupled to the vehicle network bus, the method comprising:
   providing the vehicle with a predetermined electronic control unit, the predetermined electronic control unit comprising: a processor; a memory; and an interface to the vehicle network bus;
   operating the electronic control unit to monitor messages on the vehicle network bus;
   monitoring a unique bit timing characteristics of each incoming message to establish trusted bit timing characteristics for a message and changing a trusted flag from a default of FALSE to TRUE;
   comparing the bit timing characteristics of the most recent message to the trusted bit timing characteristics for a message identifier against a predetermined threshold limit and increasing a detection counter by 1 if not within the threshold limit, and reducing the detection counter by 1 if within the threshold limit;
   setting an intrusion detection flag to TRUE if the detection counter reaches the threshold limit; and
   generating an alert upon detection of one or more intrusions.

10. The method for bus intrusion detection and neutralization for a vehicle comprising a vehicle network bus and electronic control units coupled to the vehicle network bus as claimed in claim 9 further comprising the step of communicating with the vehicle using an OBD-II port, a relay socket or a fuse port.

11. The method for bus intrusion detection and neutralization for a vehicle comprising a vehicle network bus and electronic control units coupled to the vehicle network bus as claimed in claim 9 further comprising the step of determining a length of a Synchronization Jump Width (SJW) for the message.

12. The method for bus intrusion detection and neutralization for a vehicle comprising a vehicle network bus and electronic control units coupled to the vehicle network bus as claimed in claim 9 further comprising the step of transmitting bits onto the CAN bus to force synchronization.

13. A system for intrusion detection and neutralization for a vehicle on a vehicle network bus comprising:
- a predetermined electronic control unit, the predetermined electronic control unit comprising: a processor; a memory; and an interface to the vehicle network bus based on a network standard;
- the electronic control unit monitors messages on the bus for the unique bit timing characteristics of each incoming message to establish trusted bit timing characteristics for the message and changes a trusted flag in the memory from a default of FALSE to TRUE;
- a detection counter that increases by 1 if the most recent message does not meet a pre-determined threshold limit and reduces by 1 if a message identifier is within the pre-determined threshold limit;
- the detection counter sets a detection flag to TRUE if the detection counter reaches the threshold limit; and
- the electronic control unit generates an alert upon detection of one or more intrusions based on a status of the detection flag.

14. A system for intrusion detection and neutralization for a vehicle on a network bus as claimed in claim 13 further comprising determining message identifiers sent by the electronic control unit.

15. A system for intrusion detection and neutralization for a vehicle on a network bus as claimed in claim 14 further comprising setting the intrusion detection flag to TRUE for all network message identifiers sent by the electronic control unit.

16. A system for intrusion detection and neutralization for a vehicle on a network bus as claimed in claim 14 further comprising neutralizing all network message identifiers sent by the electronic control unit.

17. A system for intrusion detection and neutralization for a vehicle on a network bus as claimed in claim 14 further comprising connection to a relay socket or a fuse port in the vehicle.

18. A system for intrusion detection and neutralization for a vehicle on a network bus as claimed in claim 13 further comprising an input compare clock.

19. A system for intrusion detection and neutralization for a vehicle on a network bus as claimed in claim 13 further comprising connection to an OBD-II port.

* * * * *